United States Patent [19]

Ohmori

[11] Patent Number: 4,643,551
[45] Date of Patent: Feb. 17, 1987

[54] MULTIPLE LIGHT EMISSION FLASH UNIT

[75] Inventor: Kouichi Ohmori, Kanagawa, Japan

[73] Assignee: Canon Kabushiki Kaisha, Tokyo, Japan

[21] Appl. No.: 790,357

[22] Filed: Oct. 23, 1985

[30] Foreign Application Priority Data

Oct. 26, 1984 [JP] Japan ................................ 59-226538

[51] Int. Cl.⁴ ............................................ G03B 15/05
[52] U.S. Cl. .................................... 354/132; 354/415
[58] Field of Search ................................ 354/132, 415.

[56] References Cited

U.S. PATENT DOCUMENTS 4,333,719 6/1982 Takami et al. ...................... 354/132

Primary Examiner—Michael L. Gellner
Attorney, Agent, or Firm—Toren, McGeady and Goldberg

[57] ABSTRACT

A plurality of preliminary illumination type flash units are connected to a camera and arranged so that for the preliminary illumination, all the units are fired at a time, but photographic information from only one of the flash units is transmitted to the camera, thereby a proper aperture value is selected automatically.

8 Claims, 5 Drawing Figures

MULTIPLE LIGHT EMISSION FLASH UNIT

BACKGROUND OF THE INVENTION

1. Field of the Invention

This invention relates to the unity of a plurality of flash units for use with a camera.

2. Description of the Prior Art

When in flash photography, for the purpose of opening up dark shadows or obtaining a larger amount of flash light than that available from a single flash unit, it has been the common practice to fire two or more flash units at a time. In such a case, the use of the conventional method of combining these flash units has made it difficult to determine what aperture value is to be set in the diaphragm of the photographic lens. It has, therefore, very often happened to the beginners to make under- or over-exposure.

Also, in case when the generally known electronic flash units are used for multi-unit flash lighting, the photo detector in the camera receives the reflection of flash light from an object to be photographed and produces a de-actuating signal for every one of the flash units, thereby it being made possible to make a correct flash exposure. Since the electronic flash units generally require the photographer to adjust the size of aperture opening by his insight, if a small aperture size is set regardless of a long object distance, an under-exposure will result even though the flash units are fully fired.

To avoid this, it has been known in the art to provide for the flash unit with a metering light source for preliminary illumination. Prior to making an exposure, the object to be photographed is illuminated with preliminary flash light, and the reflected light from the object is received by a photo detector in the flash unit. The output of the photo detector is sent to the camera in which one of prescribed two or three aperture values is selected as most proper based on the ambient light intensity and the object distance sensed by the photo detector.

In application of such preliminary illumination type flash units to the multiple flash unit lighting, however, as each of the flash units in use is connected to the camera, they provide different photographic informations from each other depending on the spatial relationship between the individual flash units and the object at the same time. Therefore, which information is to be selected is necessarily a very complicated treatment.

SUMMARY OF THE INVENTION

It is, therefore, an object of the present invention to eliminate the above-described problem and to provide a device for multiple flash unit lighting which enables to make always a correct exposure.

This and other objects of the present invention will become apparent from the following detailed description of embodiments thereof.

DETAILED DESCRIPTION OF THE PREFERRED EMBODIMENTS

Figure 1:
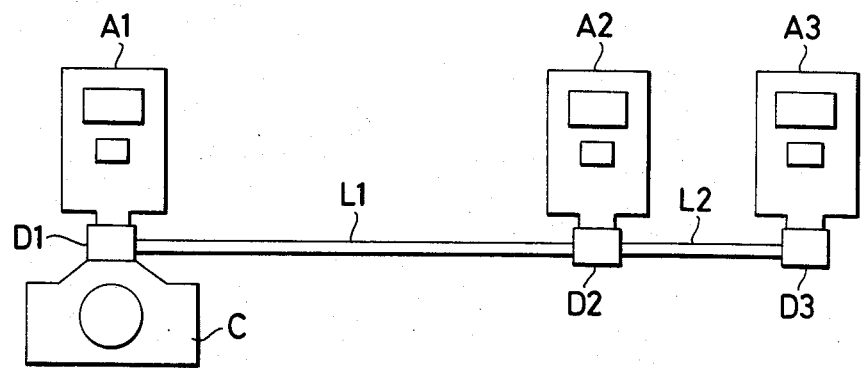
FIG. 1 is a schematic elevational view of an arrangement of a multiple flash unit lighting device.

In FIG. 1, flash units A1, A2 and A3 each have a metering light source for preliminary illumination and are connected to a camera C through respective adaptors D1, D2 and D3 and interconnecting leads L1 and L2.

Figure 2:
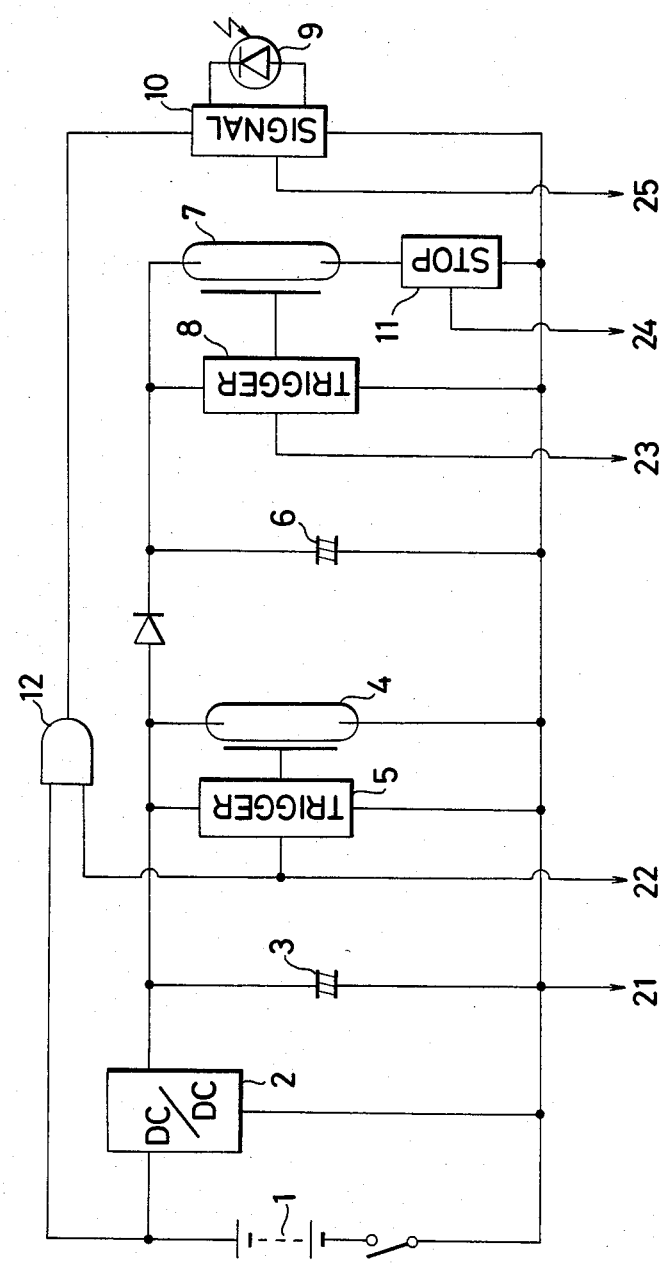
FIG. 2 is an electrical circuit diagram of each of the flash units of FIG. 1.

In FIG. 2, the circuitry of each of the flash units A1, A2 and A3 includes an electrical power source or battery 1, a condenser 3 charged from the battery 1 through a booster 2, a discharge tube 4 for preliminary flash lighting, and a trigger circuit 5 of known construction for the tube 4. A storage capacitor 6 for main flash lighting, a discharge tube 7 and a trigger circuit of known construction for the tube 7 are also included. When in the preliminary flash lighting, the reflection of the flash light of the tube 4 from an object to be photographed is received by a photo diode 9. In synchronism with the start of a preliminary flash lighting, a circuit 10 is actuated, producing an output signal representing the amount of light received by the photo diode 9. Interconnection terminals 21 to 25 are arranged to be connectable with one of the adaptors D1, D2 and D3. The terminal 21 is grounded. A preliminary firing control signal appears at the terminal 22. A main firing control signal appears at the terminal 23. A firing termination signal from a light metering circuit of known construction (not shown) in the camera C is passed through the terminal 24 to a stopping circuit 11 for the discharge tube 7. A preliminary flash lighting dependent signal appears at the terminal 25.

Figure 3:
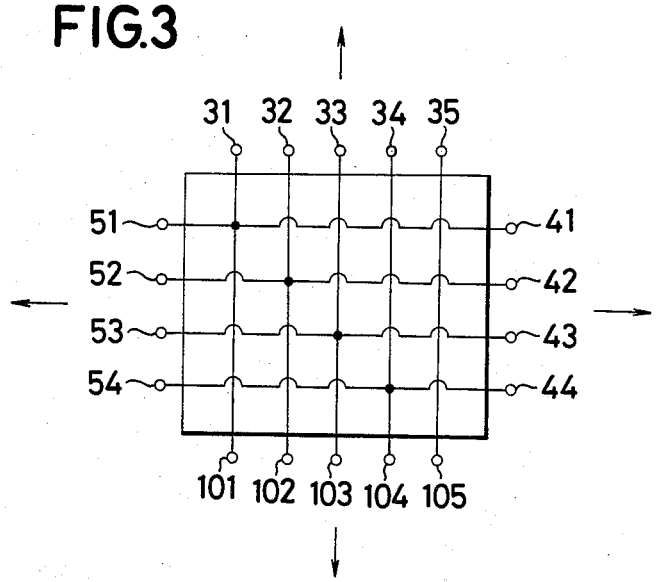
FIG. 3 is a wiring diaphram of an adaptor for multiple flash unit lighting.

FIG. 3 illustrates the details of the internal wiring of each adaptor D1, D2, D3. The adaptor has interconnection terminals 101 to 105 arranged upon attachment to the camera C, for example, at the hot shoe thereof (not shown), to connect with respective terminals (not shown) on the hot shoe, another interconnection terminals connected directly to the interconnection terminals 101 to 105 respectively and arranged upon attachment to the flash unit A1, A2 or A3 to connect with the terminals 21 to 25 of FIG. 2 respectively.

Additional two sets of interconnection terminals 41 to 44 and 51 to 54 are for connection with another adaptors, wherein the terminals 41 and 51, 42 and 52, 43 and 53, and 44 and 54 are connected to each other in each pair and also connected to the interconnection terminals 101 to 104 for the camera C respectively.

When the flash unit A1 attached to the camera C through the adaptor D1 is to be used with addition of another flash unit A2, the terminals 51 to 54 of another adaptor D2 are brought into connection with the terminals 41 to 44 of the first adaptor D1 through connection lines L1. In a similar fashion, the number of flash units can be increased.

Thus, the ground terminal 21, preliminary flash actuating signal terminal 22, main flash actuating signal terminal 23, firing termination signal terminal 24 are connected to respective terminals (not shown) on the camera housing. It is to be noted here that the metering light signal terminal 25 of only the one of the flash units which lies just on the camera C is connected through the terminals 35 and 105 of the adaptor D1 to a terminal (not shown) on the camera housing, while those of the other flash units A2 and A3 are not connected to that terminal.

With this arrangement, after both storage capacitors 3 and 6 for preliminary and main flash lightings of all the flash units A1 to A3 have been fully charged to a high D.C. voltage from the respective batteries 1 and boosters 2, when the camera C gives off an actuating signal for preliminary flash lighting by the method known in the art, which signal is applied from the terminal 102 of the adaptor D1 through its terminal 32 to the terminal 22 of the flash unit A1 and at the same time through the terminal 42 of the first adaptor D1 to the terminal 52 of the second adaptor D2 and therefrom through its terminal 32 to the terminal 22 of the second flash unit A2, and, of course, further through the terminal 42 of the second adaptor D2 and the terminal 52 of the third adaptor D3 to the terminal 22 of the third flash unit A3, all the trigger circuits 5 in the three flash units are actuated at a time to discharge the charges on the condensers 3 through the tubes 4, thereby the tubes 4 are fired. Thus, the object to be photographed is preliminarily illuminated with the sum of flash light from the three tubes 4. The reflection of the flash light from the object enters the photo detector 9 of each of the flash units A1, A2 and A3. Since an operation of the signal forming circuit 10 has been initiated in synchronism with the actuating signal for preliminary flash lighting which signal comes from the terminal 22 and passes through an AND gate 12, and whose width is so long as to permit production of the output of the signal forming circuit 10, a metering light signal from the circuit 10 appears at the terminal 25 of the flash unit A1. The other two flash units A2 and A3 also produce respective metering light signals at the equivalent terminals 25 thereof. But, because the terminals 25 of these two flash units A2 and A3 are not connected to the terminal 105 of the first adaptor D1, the signal at the terminal 25 of the first flash unit A1 only is allowed to go into the camera C through the terminals 35 and terminal 105, the latter being connected to the corresponding input terminal of the camera C. In the camera C, by the metering light signal or photographic information from the first flash unit A1, the size of aperture opening of the photographic lens (not shown) is automatically adjusted to a proper value. Since such an adjusting method is well known to those skilled in the art, no explanation about it is made here.

Then, responsive to a shutter release, an actuating signal for main flash lighting is supplied from a terminal (not shown) of the camera C through the terminal 103 of the first adaptor D1 to all three terminals 23 of the flash units A1, A2 and A3, thereby the respective trigger circuits 8 are actuated to fire the three discharge tubes 7 at the same time with supply of electrical energy from the respective condensers 6. Thus, the object to be photographed is illuminated with the sum of flash light from the three units A1, A2 and A3. The reflection of this main flash light from the object enters through the opening of the diaphragm of the camera and arrives at a photo sensor (not shown). Similarly to the ordinary electronic flash unit, when the intergrated amount of incident light reaches a prescribed level, the aforesaid light metering circuit (not shown) produces an output signal representing a termination of the firing. This signal is applied through the terminal 104 of the adaptor D1 to the stopping circuits 11 of all the flash units A1, A2 and A3, thereby the main flash lighting is terminated.

Though the foregoing embodiment has been described that the adaptors D2 and D3 for the additional flash units A2 and A3 each have the same construction as that of the adaptor D1 for the first flash unit A1 positioned just on the camera C, a modification may be made such that if the number of additional flash units (in the above embodiment, referred to by A2 and A3) is few, that adaptor which has the number of wiring connections shown in FIG. 3 is used only with the flash unit positioned just above the camera C, while the other adaptor or adaptors for the additional flash unit or units is or are provided with only the corresponding junctions to the aforesaid interconnection terminals 31 to 34, 41 to 44 and 51 to 54, that is, with exclusion of the terminals 35 and 105, so that the terminals 41 to 44 or 51 to 54 are connected through the lines L1 and L2. Of course, in this case also, the connecting lines L1 and L2 do not include the signal line for the preliminary light signal.

Figure 5:
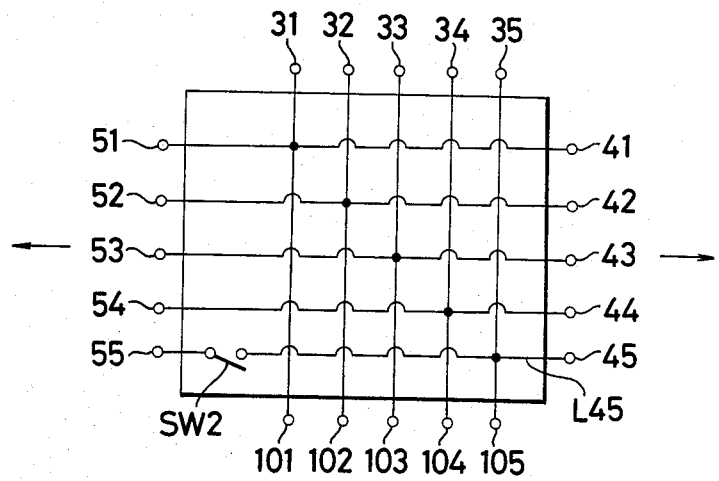
FIGS. 4 and 5 are electrical circuit diagrams of another embodiment of the flash unit and adaptor according to the invention respectively.
Figure 4:
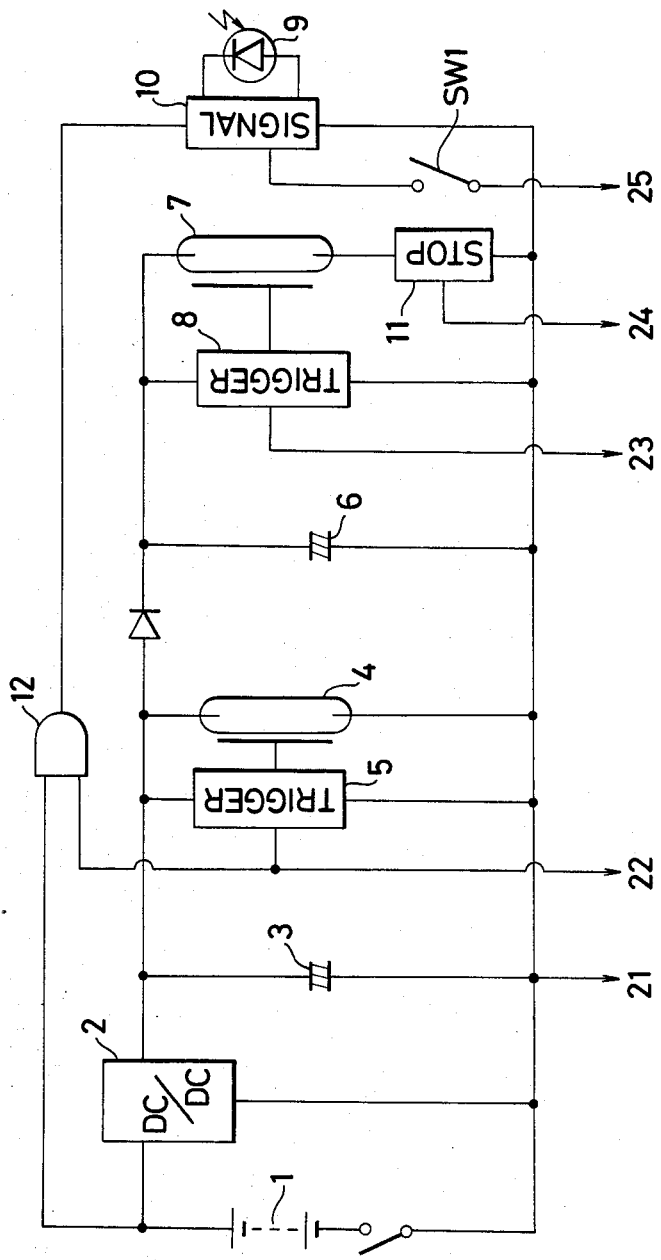

FIGS. 4 and 5 illustrate another embodiment of the invention. The circuit of FIG. 4 is obtained by adding a switch SW1 to the circuit of the flash unit of FIG. 2. The adaptor of FIG. 5 is obtained by adding to the adaptor of FIG. 3 a line L45 connected to the signal terminal 105, a switch SW2, and terminals 45 and 55. For note, the switch SW1 when applied to the additional flash units A2 and A3 of FIG. 1, takes the normally closed type and is arranged to open in response to movement of a manually operable knob (not shown) on the casing of the flash unit. Also the switch SW2 when applied to the adaptors D2 and D3, takes the normally closed type and is arranged to open in response to movement of a manually operable knob (not shown) on the casing of the adaptor.

Next, the operation of the flash unit of FIG. 4 and the adaptor of FIG. 5 in a similar arrangement to that shown in connection with the first embodiment will be described. As is understandable from FIGS. 4 and 5, since the flash unit and adaptor of FIGS. 4 and 5 are almost similar to those of FIGS. 2 and 3, let us here explain about their differences alone.

When the adaptor of FIG. 5 (let us call this adaptor as D1 in analogy to the embodiment of FIG. 1) is attached to the camera and then the flash unit of FIG. 4 is attached to the adaptor D1, the trigger terminal 21 of the flash unit (let us call this flash unit as A1 in analogy to the embodiment of FIG. 1) is connected through the terminals 31 and 101 to the terminal (not shown) on the camera, and the preliminary lighting signal terminal 22 is connected through the terminals 32 and 102 to the terminal on the camera, and the main firing signal terminal 23 is connected through the terminals 33 and 103 to the terminal (not shown) on the camera, and the firing stop signal terminal 24 is connected through the terminals 34 and 104 to the terminal (not shown) on the camera, and further the preliminary light signal terminal 25 is connected through the terminals 35 and 105 to the terminal (not shown) on the camera.

Also the terminals 21 to 25 of a first additional flash unit (this additional flash unit corresponds to the flash unit A2 of FIG. 1 and is hereinafter called A2) are connected through the terminals 31 to 35, 51 to 55 and line L1 of the adaptor connected to that flash unit A2 (this adaptor corresponds to the adaptor D2 of FIG. 1, and is hereinafter called D2) and the terminals 41 to 45 and 101 to 105 of the first adaptor D1 to the respective terminals on the camera.

Further, the terminals 21 to 25 of a second additional flash unit (this additional flash unit corresponds to the flash unit A3 of FIG. 1 and is hereinafter called A3) are connected through the terminals 31 to 35, 51 to 55 and interconnection line L2 of the adaptor connected to that flash unit A3 (this adaptor corresponds to the adaptor D3 of FIG. 1 and is hereinafter called D3), through the terminals 41 to 45 and 51 to 55 and line L1 of the adaptor D2 and through the terminals 41 to 45 and 101 to 105 of the adaptor D1 to the respective terminals (not shown) on the camera.

To cut off the transmission of the preliminary metering light signals from the circuits 10 of the flash units A2 and A3 to the camera C, either one or both of the switches SW1 and SW2 is or are opened.

Therefore, only the first flash unit A1 provides the preliminary metering light signal from the circuit 10 to the camera through the terminal 105 of the adaptor D1, thereby the size of aperture opening of the camera is automatically adjusted to a proper value related to the camera-to-object distance.

For note, in the foregoing embodiments, each adaptor, instead of separation from the flash unit, may be constructed in unison therewith.

The present invention is, as has been described above, to connect a plurality of preliminary flash lighting type flash units to each other and arranged them so that an aperture value of the photographic lens is selected by the preliminary metering light signal from only one of the flash units, thereby giving an advantage that though the structure of construction is simple, a multiple light emission flash unit that allows for the camera to automatically select a proper aperture value so that a correct flash exposure can be readily obtained can be realized.

What is claimed is:

1. A multiple flash unit system for use with a camera, comprising at least first and second flash units, a first adapter connected to said first flash unit and a second adapter connected to said second flash unit, said first flash unit including:
(a) first preliminary flash firing means for producing preliminary flash light prior to making a flash exposure, said preliminary flash firing means having a trigger terminal for receiving a trigger signal; and
(b) first preliminary light receiving signal forming means receptive of the reflection of the preliminary flash light of said first preliminary flash firing means from an object to be photographed for producing corresponding photographic information to the amount of light received, said preliminary light receiving signal forming means having an output terminal at which said photographic information is produced;

said first adapter attached to said camera including:
(a) a first transfer line connected to the trigger terminal to apply said trigger signal produced from said camera to the trigger terminal of said preliminary firing means; and
(b) a second transfer line connected to the output terminal of said preliminary light receiving signal forming means to transmit said photographic information produced from said preliminary light receiving signal forming means to said camera;

said second flash unit including:
(a) second preliminary firing means for producing preliminary flash light prior to making a flash exposure, said second preliminary firing means having a trigger terminal for receiving a trigger signal; and
(b) second preliminary light receiving signal forming means receptive of the reflection of the preliminary flash light of said second preliminary firing means from an object to be photographed for producing corresponding photographic information to the received amount of light, said second preliminary light receiving signal forming means having an output terminal at which said photographic information is produced;

said second adapter including:
(a) a third transfer line connected to the trigger terminal of said second preliminary firing means to apply said trigger signal produced from said camera through said first transfer line to the trigger terminal of said second preliminary firing means; and
(b) means for preventing said photographic information produced from said second preliminary light receiving signal forming means from being transmitted to said camera.

2. A multiple flash unit system according to claim 1, wherein said first adapter and said first flash unit are formed in separation from each other.

3. A multiple flash unit system according to claim 1, wherein said second flash unit and said second adapter are formed in separation from each other.

4. A multiple flash unit system according to claim 1, wherein said photographic information is aperture information for controlling the size of aperture opening of a photographic lens.

5. A multiple flash unit system according to claim 1, wherein said preventing means includes switching means connected to the output terminal of said second preliminary light receiving signal forming means.

6. A multiple flash unit system according to claim 1, wherein said preventing means includes switching means connected to the output terminal of said second preliminary light receiving signal forming means to prevent said photographic information produced from said second preliminary light receiving signal forming means from being transmitted from the output terminal of said second preliminary light receiving signal forming means to said second transfer line.

7. A multiple flash unit system for use with a camera, comprising at least first and second flash units, a first adapter connected to said first flash unit and a second adapter connected to said second flash unit, said first flash unit including:
(a) first preliminary firing means for producing preliminary flash light prior to making a flash exposure, said means having a trigger terminal at which a trigger signal is received; and
(b) first preliminary light receiving signal forming means receptive of the reflection of the flash light of said first preliminary firing means from an object to be photographed for producing corresponding photographic information to the received amount of light, said means having an output terminal at which said photographic information is produced;

said first adapter attached to said camera including:
(a) a first transfer line connected to the trigger terminal of said preliminary firing means so that said trigger signal from said camera is applied thereto; and
(b) a second transfer line connected to the output terminal of said preliminary light receiving signal forming means so that said photographic information is transmitted to said camera;

said second flash unit including:
(a) second preliminary firing means for producing flash light prior to making a flash exposure, said means having a terminal at which a trigger signal is received; and
(b) second preliminary light receiving signal forming means receptive of the reflection of the preliminary flash light of said second preliminary firing means from an object to be photographed for producing corresponding photographic information to the received amount of light, said means having a terminal at which said photographic information is produced;

said second adapter including:
(a) a third transfer line connected to the trigger terminal of said second preliminary firing means to apply said trigger signal from said camera through said first transfer line to said trigger terminal of said second preliminary firing means; and
(b) means for transmitting either one of photographic information from said first preliminary light receiving signal forming means and photographic information from said second preliminary light receiving signal forming means to said camera.

8. A multiple flash unit system for use with a camera, comprising at least first and second flash units, a first adapter connected to said first flash unit and a second adapter connected to said second flash unit, said first flash unit including:
(a) first preliminary firing means for producing flash light prior to making a flash exposure, said means having a terminal at which a trigger signal is received; and
(b) first preliminary light receiving signal forming means receptive of the reflection of the flash light of said first preliminary firing means from an object to be photographed for producing photographic information corresponding to the received amount of light, said means having a terminal at which said photographic information is produced;

said first adapter attached to said camera including:
(a) a first transfer line connected to the trigger terminal of said preliminary firing means to apply said trigger signal from said camera to the trigger terminal; and
(b) a second transfer line connected to the output terminal of said preliminary light receiving signal forming means to transmit said photographic information from said preliminary light receiving signal forming means to said camera;

said second flash unit including;
(a) a second preliminary firing means for producing flash light prior to making a flash exposure, said means having a trigger terminal at which a trigger signal is received; and
(b) second preliminary light receiving signal forming means receptive of the reflection of the preliminary flash light of said second preliminary firing means from an object to be photographed for producing corresponding photographic information to the received amount of light, said second preliminary light receiving signal forming means having an output terminal at which said photographic information is produced;

said second adapter including:
(a) a third transfer line connected to the trigger terminal of said second preliminary firing means to apply said trigger signal from said camera through said first transfer line to the trigger terminal of said second preliminary firing means; and
(b) means for selectively transmitting photographic informations from said first and said second preliminary light receiving signal forming means to aperture control means of said camera.

* * * * *